July 17, 1962 SABURO MIYATA MORIYA ET AL Re. 25,201

APPARATUS FOR THE IONIZATION OF ELECTRONS OF FLOWABLE MATERIALS

Original Filed June 2, 1959

INVENTORS
S. Miyata Moriya,
BY Yukichi Asakawa.
C. Chandlee Podgeon
AGENT

United States Patent Office

Re. 25,201
Reissued July 17, 1962

25,201

APPARATUS FOR THE IONIZATION OF ELECTRONS OF FLOWABLE MATERIALS

Saburo Miyata Moriya and Yukichi Asakawa, both of Tokyo, Japan, assignors to International Patent Cooperation, Hong Kong Original No. 2,926,276, dated Feb. 23, 1960, Ser. No. 817,535, June 2, 1959. Application for reissue Sept. 20, 1960, Ser. No. 57,874
10 Claims. (Cl. 313—153)

Matter enclosed in heavy brackets [ ] appears in the original patent but forms no part of this reissue specification; matter printed in italics indicates the additions made by reissue.

This invention relates to an apparatus to intensify the ionization of electrons of flowable materials, particularly liquids, or gases.

In the purification of liquids, particularly water, they are sometimes subjected to electric ionization.

One object of this invention is the provision of means for intensifying the ionization of liquids or gases.

A further object of this invention is the provision of means wherein fluids or gases are subjected to a series of strong magnetic fields.

Another object of this invention is the provision of apparatus wherein the fluids or gases are subjected to the ionizing effect of electric currents passing therethrough.

An additional object of this invention is the provision of means for intensifying the ionization of fluids or gases wherein the fluids or gases are subjected to the effects of an electric ionization current, preferably high or low tension of negligible capacity (voltage of which is in relation to the conductivity of the flowable material) and then to the effect of strong magnetic fields.

These and other objects will become apparent from a consideration of the following specification taken with the accompanying drawings forming a part thereof.

Figure 1:
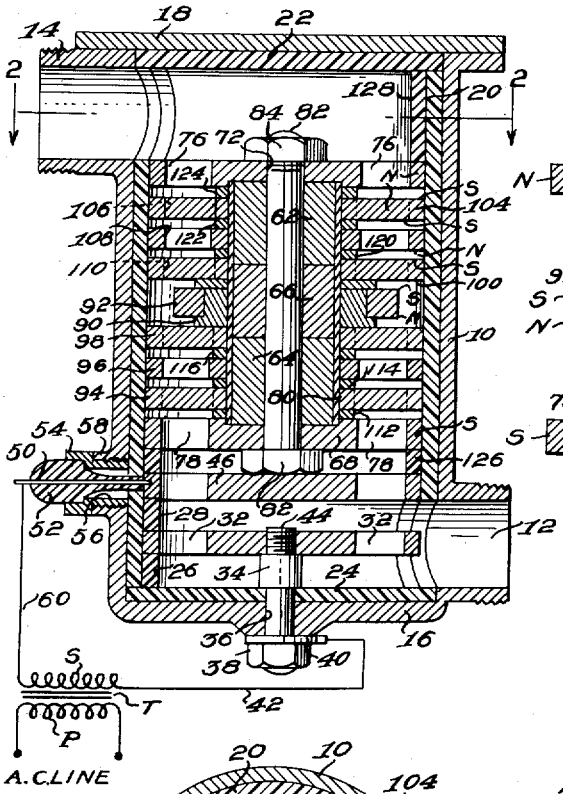
FIG. 1 is a vertical section through a preferred form of our device.
Figure 3:
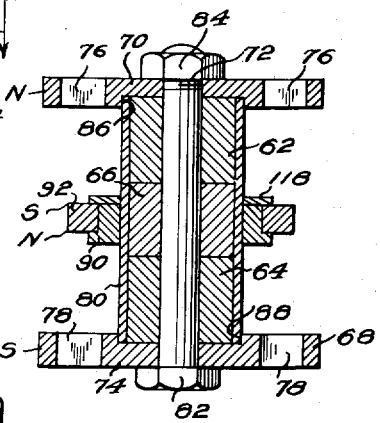
FIG. 3 is a vertical section of a portion of the magnetic apparatus; *and*
Figure 2:
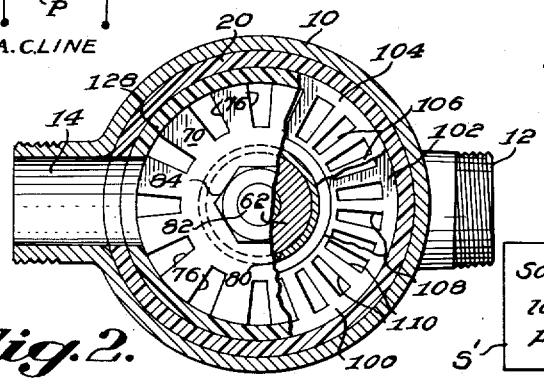
FIG. 2 is a part sectional plan view taken on the line 2—2 of FIG. 1 and showing parts broken away.

Referring now to FIGS. 1 and 2, a preferably cylindrical casing 10, having an inlet 12 adjacent one end and an outlet 14 adjacent the other end, is preferably formed of non magnetic and non corrodible material such as brass aluminum or 18–8 stainless. If cost be a factor, soft iron may be used for the casing 10, as the arrangement of magnets used herein have very little flux leakage. The casing 10 has an integral bottom 16 and a cover 18 suitably attached thereto. Within the casing 10 we provide an insulating cylindrical liner 20 and upper and lower end liners 22 and 24, respectively, such liners being formed of suitable inert plastic material.

A pair of insulating spacer rings 26, 28, placed in the lower or inlet end of the casing 10, retain a disc 30 having annularly spaced openings 32 therein. A stud 34 passes through an opening 36 in the bottom 16, and is threaded at its lower end for a nut 38. A washer 40, connected by means of a line 42 to the secondary S of a step up or step down transformer T, is clamped under the nut 38. The upper end of the stud 34 is threaded at 44 into the disc 30. The disc 30 thus becomes one terminal, preferably the grounded terminal, of an alternating current supply. The other terminal of the secondary S is connected to a metallic disc 46 having annularly arranged perforations 48 therein. A suitable conductor 50 is connected to the disc 46 and passes through an insulating bushing 52 mounted in a sleeve 54 threaded in an opening 56 in a boss 58 mounted in the side of the casing 10. The conductor 50 is connected by means of a line 60 to the secondary S of the transformer T. The primary P of the transformer T is connected to an A.C. line supplied with commercial voltage.

Fluids entering the inlet 12 flow around and through the discs 30 and 46 and are subjected to the ionizing effect of the A.C. potential applied to these two discs, gaps of which are adjustable in relation to the voltage employed and material passing therethrough.

Figure 4:
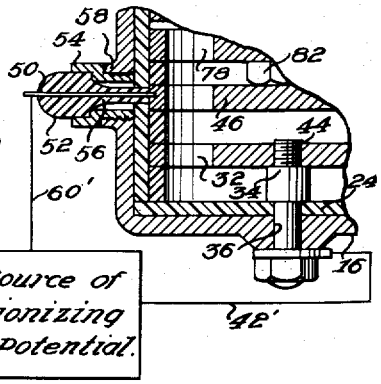
*FIG. 4 is a fragmentary view similar to FIG. 3 showing the use of any well known source of ionizing potential such as a generator, a battery or a transformer as in FIG. 1.*

*As shown in FIG. 4, the source of ionizing potential need not be the transformer T, but may be any suitable well known source S', such as a battery, a generator or a step-up or step-down transformer. The wire 42' connects one side of the source S' to the terminal 50 and the wire 42' connects the other side of the source S' to the washer 40, as described above.*

To further intensify the ionization effect, we provide a magnet structure including a pair of axially spaced tubular magnets 62, 64, a tubular spacer 66 of paramagnetic material and a pair of pole pieces 68, 70 of soft iron or other suitable paramagnetic material, having openings 72 and 74, respectively, therein. The discs 68 and 70 are provided respectively with annularly arranged openings 76, 78. A sleeve 80 surrounds the magnets 62, 64 and the spacer 66, and the whole assembly is held together by means of a bolt 82 and nut 84. The pole pieces 68 and 70 preferably have counter bores 86 and 88 respectively therein, to accommodate the sleeve 80 and the ends of the magnets 62, 64.

Intermediate the ends of the magnet assembly we place a spacer of non magnetic material 90 and mount thereon a ring magnet 92, used as concentrator. On the magnet assembly are placed also a series of magnetic grids 94, 96, 98, 100, 102 and 104, each having an annular series of openings therein, such as 106 in grid 104; 108 in grid 102; 110 in grid 100 etc. As is clearly shown in FIG. 2, the openings 106, 108, 110 etc. in the grids 104, 102, 100 etc. are staggered with respect to each other.

The grids 94, 96 and 98 are spaced by means of spacers 112, 114 and 116 from the pole piece 70 and from each other. Spacer 90 rests on grid 98 and a spacer 118 rests on the spacer 90 to separate the magnet 92 from the grid 100. Grids 100, 102 and 104 are separated by spacers 120 and 122, and a spacer 124 separates grid 104 from the pole piece 68. The spacers 90 and 112 to 124 are of non magnetic material.

The whole magnetic assembly 62—124 above described rests on a spacer 126 of insulating material and a spacer ring 128 of insulating material fills the space between the magnet assembly and the cover plate insulator 22. The magnets 62, 64 and 92 are preferably formed of very high permeability alloys and provide, between the pole pieces 68 and 70, a field of intense magnetic flux. If desired, grids 94, 96, 98, 100, 102 and 104 may be omitted.

The use of the spacers as described above causes each grid to have its own N. and S. polarity as shown in the drawings by the letters "N." and "S.".

By the use of spacers 26 and 28 of different axial dimensions the spacing between the plates 30 and 46 may be varied.

In use, fluid entering the casing in inlet 12 are first subjected to the potential between the plates 30 and 46 to effect ionization. The ionization is further intensified by the strong magnetic flux in the space between the pole pieces 68 and 70 as the fluid passes in a tortuous path through the magnetized grids 94, 96, 98, 100 and 104 on its way to the outlet 14.

We claim:

1. In a device for increasing the ionization of fluids comprising a substantially cylindrical casing having an inlet at one end and an outlet at the other end, a pair of spaced electrodes adjacent the inlet for applying an [A.C.] ionizing potential, means in said casing spaced from said electrodes, for producing an area of strong magnetic flux; said means comprising a magnet assembly including a magnetic core and a pair of spaced pole pieces and shielding means for said core; means in said flux area for producing a tortuous path for fluids passing from the inlet to the outlet.

2. The structure as defined in claim 1 wherein said spaced electrodes comprise a pair of spaced discs insulated from each other, and including a transformer having its secondary connected to said discs.

3. The structure as defined in claim 1 wherein the magnetic core comprises a pair of spaced apart tubular magnets of high permeability alloy, a spacer of paramagnetic material between said magnets and means securing said magnets, said spacer, said shield and said pole pieces together.

4. The structure as defined in claim 3 including a ring magnet height of which is less than the spacer intermediate said pole pieces and spaced from said shield.

5. The structure as defined in claim 4 including a plurality of grids of paramagnetic material in the flux area between said pole pieces, said grids being spaced from each other and said pole pieces, and each comprising a disc having N. and S. poles.

6. The structure as defined in claim 5 wherein the polarity of each of said magnets and each disc is in the same direction relative to the direction of flow of fluid.

7. The structure as defined in claim 1 wherein the core means for producing an area of strong magnetic flux comprises high permeability magnet and a pair of disc pole pieces affixed thereto.

8. The structure as defined in claim 7 wherein the means causing the fluid to follow a tortuous path comprises a plurality of spaced discs of paramagnetic material axially arranged between said pole pieces.

9. The structure as defined in claim 8 wherein the pole pieces and the discs have openings therein for the passage of fluids.

10. The structure as defined in claim 9 wherein the openings are annularly spaced and staggered from disc to disc.

References Cited in the file of this patent or the original patent

UNITED STATES PATENTS

| | | |
|---|---|---|
| 2,668,260 | Barnett et al. | Feb. 2, 1954 |
| 2,826,709 | Von Ardenne | Mar. 11, 1958 |